United States Patent [19]

Huggler

[11] Patent Number: 5,901,639
[45] Date of Patent: May 11, 1999

[54] TEMPERATURE SENSITIVE TIMING ASSEMBLY FOR TOASTER APPLIANCE

[75] Inventor: Peter E. Huggler, Columbia, Mo.

[73] Assignee: Toastmaster Inc., Columbia, Mo.

[21] Appl. No.: 08/769,657

[22] Filed: Dec. 19, 1996

[51] Int. Cl.$^6$ ............................... A47J 37/08; H05B 1/02
[52] U.S. Cl. ............... 99/328; 99/329 P; 99/329 RT; 99/333; 99/338; 99/385; 99/389; 99/391; 219/489; 219/492; 219/521
[58] Field of Search ................... 99/325–335, 337, 99/338, 385, 389–392, 393–399; 219/386, 412, 464, 492, 501, 514, 519, 489, 521, 536, 537, 542

[56] References Cited

U.S. PATENT DOCUMENTS

| | | | |
|---|---|---|---|
| 2,621,584 | 12/1952 | Palmer | 99/328 |
| 2,734,448 | 2/1956 | McCullough | 99/328 |
| 2,739,523 | 3/1956 | McCullough | 99/328 |
| 2,878,748 | 3/1959 | Stanek | 99/328 |
| 2,879,707 | 3/1959 | Ambrose | 99/328 |
| 3,129,649 | 4/1964 | Visos | 99/329 P |
| 3,129,651 | 4/1964 | Visos | 99/329 P |
| 3,129,652 | 4/1964 | Kueser | 99/329 P |
| 3,202,799 | 8/1965 | Andrews | 219/492 |
| 3,242,294 | 3/1966 | Kauffman | 200/136.3 |
| 3,291,968 | 12/1966 | Snyder | 219/489 |
| 3,509,321 | 4/1970 | Kimura et al. | 219/492 |
| 3,684,861 | 8/1972 | DeRemer | 165/413 |
| 3,740,528 | 6/1973 | Wohlfart et al. | 219/510 |
| 4,154,151 | 5/1979 | Mochizuki | 99/329 R |
| 4,201,124 | 5/1980 | Huggler | 99/327 |
| 5,018,437 | 5/1991 | San Juan | 219/492 |
| 5,283,421 | 2/1994 | Richards | 99/327 |
| 5,304,782 | 4/1994 | McNair et al. | 99/329 RT |
| 5,385,082 | 1/1995 | Huggler et al. | 99/328 |
| 5,402,708 | 4/1995 | Krasznai et al. | 99/328 |

*Primary Examiner*—Timothy F. Simone
*Attorney, Agent, or Firm*—Stinson, Mag & Fizzell

[57] ABSTRACT

A temperature sensitive timing assembly for a toaster appliance includes a single bimetallic element having a first portion connected to a support bracket, which in turn is mounted on a mounting bracket for pivotal movement relative to the mounting bracket. A spring is positioned between the mounting bracket and the support bracket to bias the support bracket toward the mounting bracket. A stop is mounted to the mounting bracket which locks the support bracket in a fixed position when actuated by the toaster carriage assembly at the beginning of a toasting cycle. The bimetallic element has a second portion which operatively activates the toaster lock release assembly at the end of a toasting cycle. The bimetallic element also has a third portion which operatively allows the support bracket to reposition at the end of a toasting cycle so as to provide virtually immediate initiation of the next toasting cycle providing substantially the same toast color as the previous toasting cycle.

14 Claims, 4 Drawing Sheets

5,901,639

TEMPERATURE SENSITIVE TIMING ASSEMBLY FOR TOASTER APPLIANCE

FIELD OF THE INVENTION

The present invention relates in general to electric food preparation appliances and, more particularly, to an improved toaster appliance having a temperature sensitive timing assembly.

BACKGROUND OF THE INVENTION

In conventional bread toasters which use bimetallic elements to control the length of a toasting cycle, temperature sensitive timing assemblies have been provided which include both a main bimetallic element and a compensating bimetallic element to solve the problems of long reset times between toasting cycles and lighter toast color upon successive toasting cycles. Such a dual bimetallic arrangement is described in U.S. Pat. No. 4,201,124, issued to the assignee of the present application, and incorporated by reference herein as if fully set forth. Although this arrangement has worked advantageously for the assignee, a temperature sensitive timing assembly which employs a single bimetallic element to solve the same noted problems has been developed which employs fewer parts, and is thus more economical to manufacture.

SUMMARY OF THE INVENTION

Accordingly, it is a primary object of the present invention to provide a new and improved temperature sensitive timing assembly for a toaster appliance which employs a single bimetallic element to provide a virtually instantaneous reset time between toasting cycles and to provide substantially uniform toast color upon successive toasting cycles.

A further object of the present invention is to provide a new and improved temperature sensitive timing assembly of the above-described type which employs fewer parts, and is thus more economical to manufacture.

Briefly, a preferred embodiment of the temperature sensitive timing assembly according to the invention includes a single bimetallic element having a first portion spaced between a second portion and a third portion.

The first portion of the bimetallic element is connected to a support bracket wherein the support bracket mounts the bimetallic element. The support bracket is mounted on a mounting bracket for pivotal movement in first and second directions relative to the mounting bracket. A spring is positioned between the mounting bracket and the support bracket to bias the support bracket toward the first direction.

The second portion of the bimetallic element is operatively connected to the toaster lock release assembly so as to control the toasting time of a toasting cycle. The third portion of the bimetallic element operatively engages the mounting bracket so as to limit the movement of the support bracket in the first direction.

The timing assembly also includes a stop mounted on the mounting bracket and positioned for operative connection to the toaster carriage assembly and to the support bracket.

When a toasting cycle is initiated, the toaster carriage assembly moves to a latched toasting position, thereby engaging and actuating the stop. When actuated, the stop engages and locks the support bracket, and thus the first portion of the bimetallic element, in a fixed position.

As the toaster heats, the second portion of the bimetallic element bends in the second direction so as to operatively activate the toaster lock release assembly at the end of the toasting cycle. When activated, the toaster lock release assembly releases the latch of the toaster carriage assembly, which thereby resets to a nontoasting position. Upon reset, the toaster carriage assembly disengages the stop, which thereby unlocks and disengages the support bracket.

Simultaneously, as the toaster heats, the third portion of the bimetallic element bends in the second direction so as to operatively disengage the mounting bracket. Therefore, when the stop disengages the support bracket at the end of the toasting cycle, the support bracket moves in the first direction until the third portion of the bimetallic element operatively engages the mounting bracket. The support bracket, and thus the bimetallic element, is thereby repositioned so as to permit virtually immediate initiation of the next toasting cycle providing substantially the same toast color as the previous toasting cycle.

DETAILED DESCRIPTION OF THE INVENTION

Figure 1:
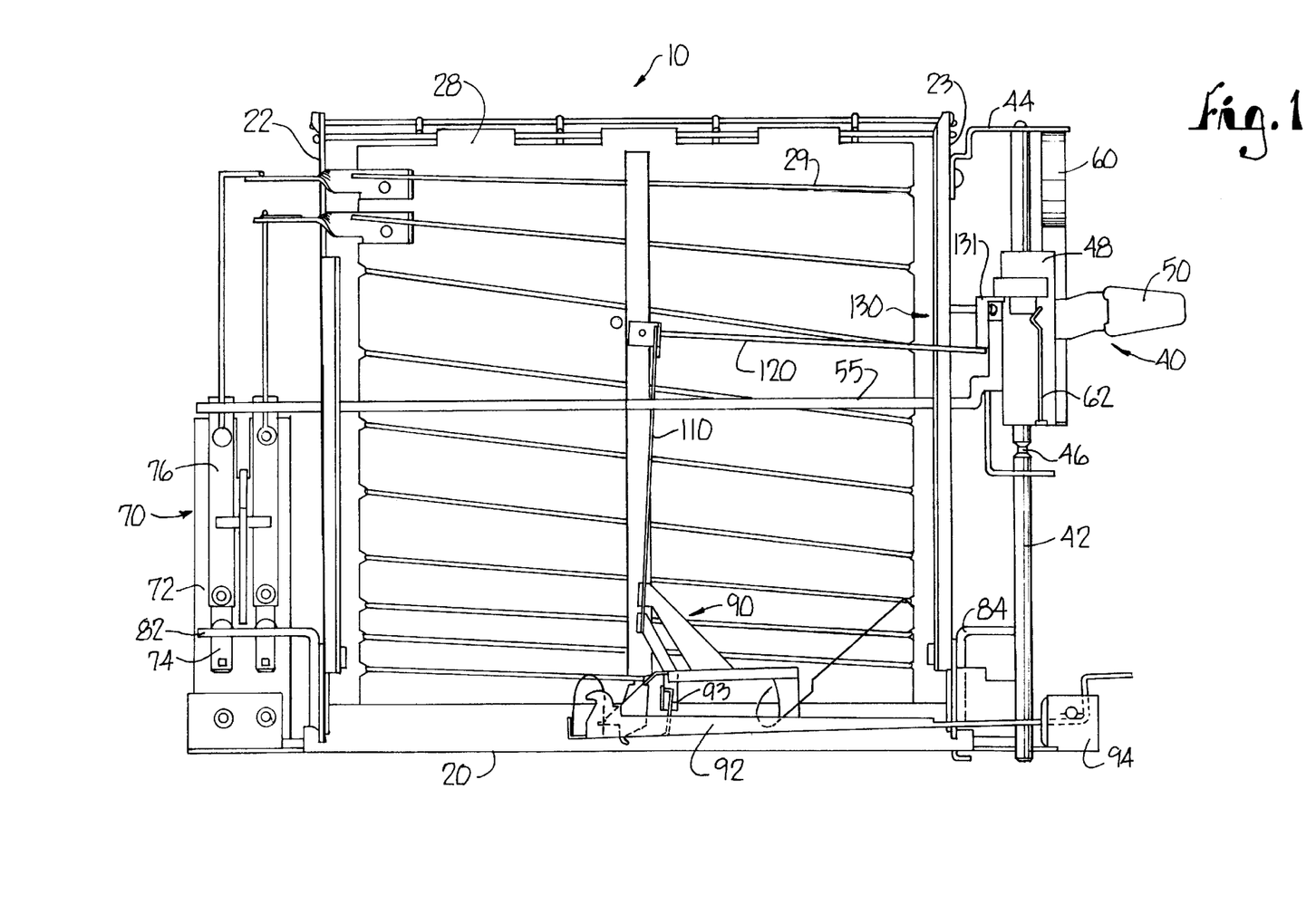
FIG. 1 is a side view (with the housing and side wall removed) of a toaster appliance including a temperature sensitive timing assembly according to the present invention.

With reference to FIG. 1, a toaster, designated generally by the numeral 10, includes a temperature sensitive timing assembly 90 according to the present invention. The housing and the side wall of the toaster 10 have been removed to show the interior of the toaster 10 and the location of the timing assembly 90 therein.

The interior of the toaster 10 is defined by a bottom frame 20, first and second end walls 22, 23 mounted to the bottom frame 20, and first and second side walls (not shown) mounted to the bottom frame 20. The bottom frame 20, together with the end walls 22,23 and the side walls, complete a single cavity for the toaster 10 so as to toast a single slice of bread. If further cavities are desired so as to toast further slices of bread, there may be disposed one or more center walls 28 between the side walls. The center walls 28 thus subdivide the area between the side walls to create further cavities. In the illustrated embodiment, a single center wall 28 creates two cavities so as to toast two slices of bread.

The side walls and the center wall 28 mount electrical resistance heating elements 29, with the heating element 29 mounted on the center wall 28 extending along both faces of the center wall 28 to provide heat to each of the cavities formed by the center wall 28. The side walls and the center wall 28 are formed of suitable material to withstand the heat of the heating elements 29.

The end walls 22, 23 mount bread guards (not shown), of the conventional type, to prevent contact between the bread slices and the heating elements 29.

The toaster 10 further includes a mechanism for conveying bread slices into and out of the toasting cavities between toasting and nontoasting positions, respectively. In the illustrated embodiment, this mechanism consists of a carriage assembly, designated generally by the numeral 40. The carriage assembly 40 is mounted upon a slide rod 42. The slide rod 42 is vertically oriented and is mounted to the bottom frame 20 and to a rod strut 44 which in turn is fixed to the end wall 23. The slide rod 42 has a substantially constant diameter throughout its length, with the exception of a detent 46 formed at a position between the ends of the slide rod 42. The detent 46 is formed as a depression in the outer surface of the slide rod 42, and is preferably a circumferential groove about the slide rod 42.

Although other designs are possible, in the illustrated embodiment, the carriage assembly 40 includes a carriage frame 48 mounted upon the slide rod 42 and having a generally planar body oriented substantially parallel to the end wall 23. The carriage frame 48 has appropriate apertures to receive the slide rod 42 with a sliding fit such that the carriage frame 48 may move vertically upon the slide rod 42 between a raised nontoasting position and a lowered toasting position.

The carriage assembly 40 also includes a handle 50 pivotally mounted to the carriage frame 48 adjacent the upper end thereof. The handle 50 extends beyond the exterior of the housing to allow a user to manually lower the carriage frame 48 to the toasting position or raise the carriage frame 64 to the nontoasting position.

The carriage assembly 40 also includes one or more bread supports 55 attached to the carriage frame 48 and positioned within the toasting cavities to support the bread slices to be toasted. The bread supports 55 are horizontally oriented and extend through guide slots (not shown) in the end walls 22, 23. The guide slots are vertically oriented and have a size slightly greater than that of the bread supports 55 such that the guide slots restrict unwanted lateral movement of the bread supports 55, yet allow them to move vertically up and down with the carriage frame 48 so as to move the bread slices between the raised nontoasting position and the lowered toasting position. The bread supports 55 are positioned such that the bread slices will extend upwardly beyond the housing when the carriage frame 48 is in the raised nontoasting position, and such that the bread slices are fully received within the toasting cavities when the carriage frame 48 is in the lowered toasting position.

To maintain the carriage frame 48 in the raised nontoasting position for receipt of bread slices, and to move the carriage frame 48 to the raised nontoasting position upon completion of a toasting cycle, the carriage assembly 40 also includes a biasing spring 60 extending between the carriage frame 48 and the rod strut 44. The spring 60 thereby biases the carriage frame 48 toward the raised nontoasting position.

To releasably maintain the carriage frame 48 in the lowered toasting position, the carriage assembly 40 also includes a releasable latch 62. The latch 62 is mounted to the carriage frame 48 such that the latch 62 engages with the detent 46 when the carriage frame 48 is moved to the lowered toasting position. The latch 62 is biased towards the slide rod 42 such that the latch 62 engages with the detent 46 automatically upon contact. The latch 62 thereby maintains the carriage frame 48 in the lowered toasting position.

The toaster 10 further includes a mechanism for selectively energizing the heating elements 29 to toast the bread slices. In the illustrated embodiment this mechanism consists of a heat activation assembly, designated generally by the numeral 70.

Although other designs are possible, in the illustrated embodiment, the heat activation assembly 70 includes an electrically insulative base 72 mounted to the bottom frame 20. The base 72 extends vertically upward in a longitudinal plane, although other orientations, including horizontal, may be employed.

The heat activation assembly 70 also includes a pair of supply contacts 74 and a pair of spring contacts 76 mounted to the base 72. The supply contacts 74 are connected to a power source, and the spring contacts 76 are operably connected to the heating elements 29 via appropriate wiring. The spring contacts 76 are formed of a spring metal and are mounted such that in their unbiased condition they are spaced from abutment with the supply contacts 74. As such, in their normal condition the spring contacts 76 and the supply contacts 74 do not complete a circuit between the power source and the heating elements 29, and the heating elements 29 are not energized.

The heat activation assembly also includes an electrically insulative presser (not shown) mounted to the base 72. The presser takes the form of a substantially rigid plate extending outwardly from the base 72 in a direction similar to that of the spring contacts 76. The presser is pivoted to the base 72, and includes a pair of shoulders which are in abutment with the spring contacts 76 at a position spaced from their connection to the base 72. Pivotal movement of the presser toward the base 72 causes similar pivotal movement of the spring contacts 76 until the spring contacts 76 come into abutment with the supply contacts 74. As such, the spring contacts 76 and the supply contacts 74 complete a circuit between the power source and the heating elements 29, and the heating elements 29 are energized.

Although other designs are possible, in the illustrated embodiment, pivotal movement of the presser, and thus the spring contacts 76, is achieved by rotation of a pivot rod (not shown). The pivot rod is pivotally mounted to the bottom frame 20 and includes an upstanding contact leg 82 at a first end thereof, and an upstanding carriage leg 84 at a second end thereof. Rotation of the pivot rod is achieved by moving the carriage frame 48 to its lowered toasting position such that the carriage frame 48 engages and causes rotation of the carriage leg 84, which rotates the pivot rod and the contact leg 82, thereby pivoting the presser and the spring contacts 76 to activate the heat activation assembly 70.

The toaster 10 further includes a mechanism according to the present invention for controlling the length of time between toasting cycles such that the reset time is virtually instantaneous and for controlling the length of the toasting cycles such that the toast color of successive toasting cycles is substantially uniform. In the illustrated embodiment this mechanism consists of a temperature sensitive timing assembly, designated generally by the numeral 90.

Although other designs are possible, in the illustrated embodiment, the timing assembly 90 includes a mounting bracket 92 mounted to the bottom frame 20 of the toaster 10. The mounting bracket 92 has a generally planar body oriented substantially parallel to the bottom frame 20, and has a limiting arm 93 extending vertically from the body in a direction away from the bottom frame 20. The connection of the mounting bracket 92 to the bottom frame 20 is pivotal, with the orientation of the mounting bracket 92 with respect to the bottom frame 20 controlled by a darkness control assembly 94. As is known in the art, the darkness control assembly 94 extends beyond the exterior of the housing to allow a user to control the toast color of the bread slices. As such, the mounting bracket 92 can be pivoted toward or away from the bottom frame 20 to lengthen or shorten, respectively, the toasting cycle.

Figure 2:
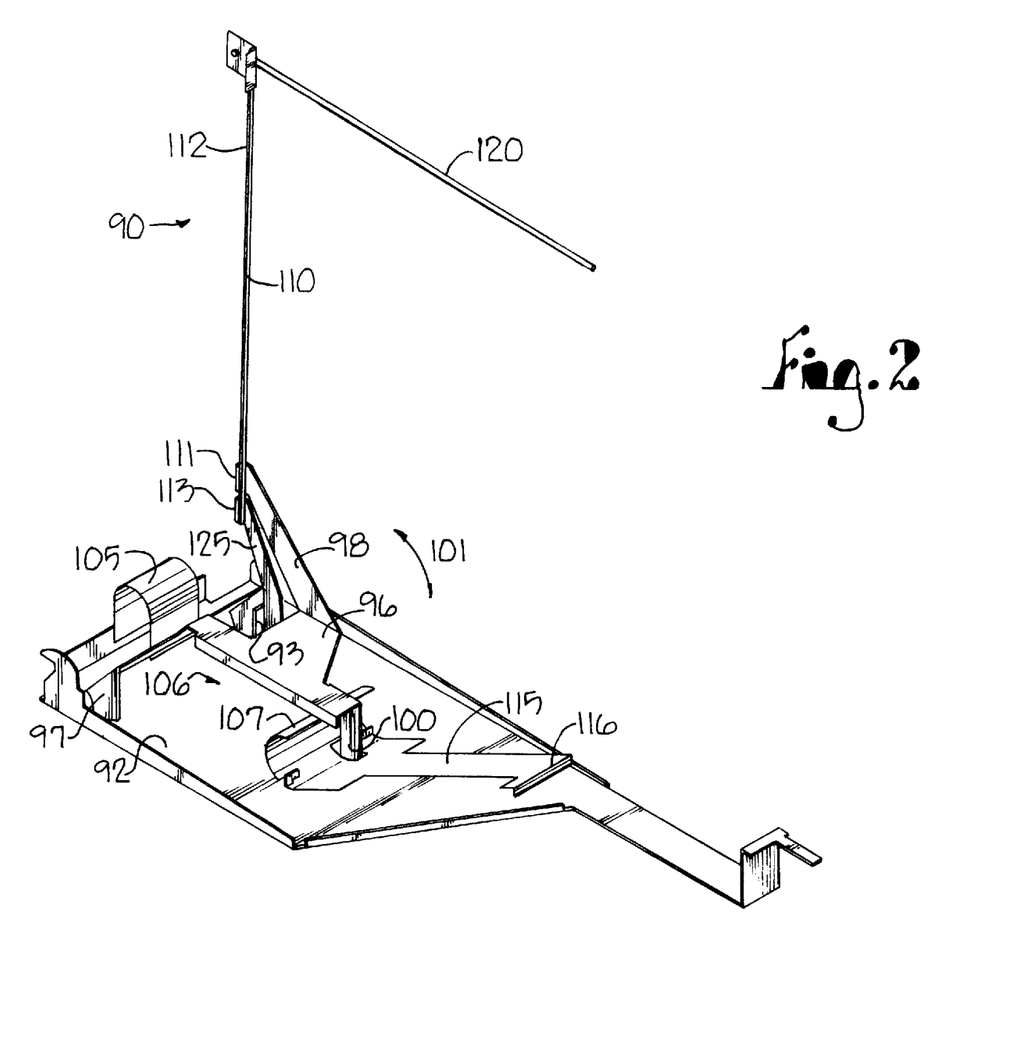
FIG. 2 is a perspective view of the temperature sensitive timing assembly of FIG. 1.

With reference to FIG. 2, the timing assembly 90 also includes a support bracket 96 mounted to the mounting bracket 92 at a pivot point 97. The support bracket 96 has a generally planar body oriented substantially parallel to the mounting bracket 92, a support arm 98 extending vertically from the body at an angle in a direction away from the mounting bracket 92, and a stop arm 100 extending vertically from the body in a direction toward the mounting bracket 92. The connection of the support bracket 96 to the mounting bracket 92 is pivotal such that the support bracket 96 pivots toward and away from the mounting bracket 92 in the direction of arrow 101.

The timing assembly 90 includes a spring 105 formed of a spring metal and positioned between the mounting bracket 92 and the support bracket 96. The spring 105 biases the support bracket 96 toward the mounting bracket 92 in the direction of arrow 106.

The timing assembly 90 includes a stop 115 pivotally mounted to the mounting bracket 92. The stop 115 is formed of a spring metal and is mounted such that in its unbiased condition a first free end 116 is positioned to contact at least one of the bread supports 55 and a second free end 117 is spaced from abutment with the stop arm 100 of the support bracket 96.

The timing assembly also includes a bimetallic element 10, such as Part No. 39-22 manufactured by Hood. The bimetallic element 110 is mounted to the support arm 98 of the support bracket 96 at a first portion 111 of the bimetallic element 110. A second portion 112 of the bimetallic element 110 has fixed thereto a trip wire 120 which extends through the end wall 23 of the toaster 10. The trip wire 120 is freely moveable through the end wall 23 such that the position of the free end of the trip wire 120 is dependent upon the position of the second portion 112 of the bimetallic element 110. A third portion 113 of the bimetallic element 110 has fixed thereto a compensator 125 which is positioned to contact the limiting arm 93 of the mounting bracket 92 so as to limit the movement of the support bracket 96 in the direction of arrow 106.

The length of the second portion 112 of the bimetallic element 110 is 2.40 inches, plus or minus 0.015 inches, and the length of the third portion 113 of the bimetallic element 110 is 0.065 inches, plus or minus 0.005 inches. Of course, if a different bimetallic element 110 is employed, these lengths will vary.

With reference to FIG. 1, the toaster 10 also includes a mechanism for disengaging the latch 62 of the carriage assembly 40. In the illustrated embodiment this mechanism consists of a lock release assembly, generally designated as numeral 130.

Although other designs are possible, in the illustrated embodiment, the lock release assembly 130 includes a drop frame 131 mounted vertically above the carriage frame 48 upon the slide rod 42 and having a generally planar body oriented substantially parallel to the end wall 23. The drop frame 131 has appropriate apertures to receive the slide rod 42 with a sliding fit such that the drop frame 131 may move vertically upon the slide rod 62 between a raised set position and a lowered released position.

Figure 3:
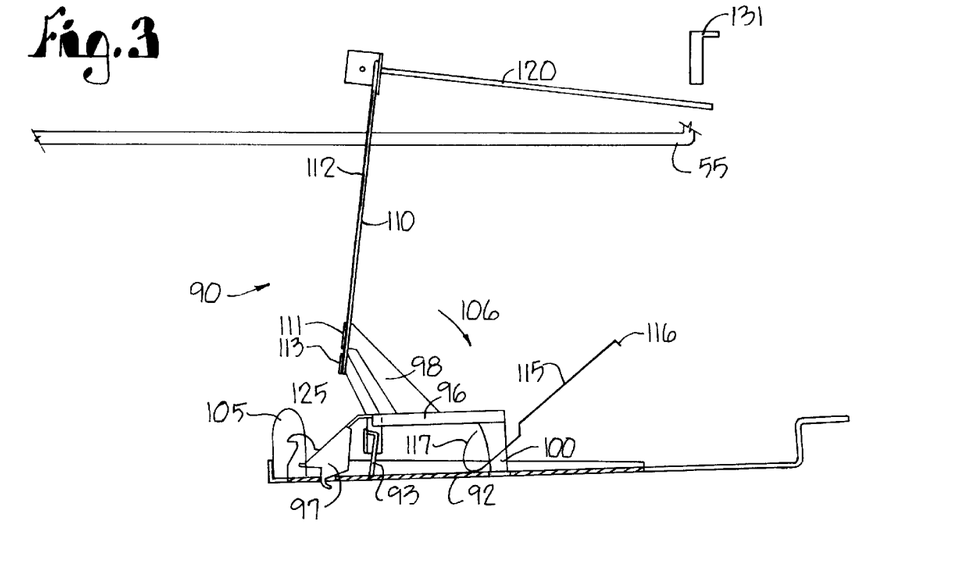
FIG. 3 is a side view of the temperature sensitive timing assembly of FIG. 1 shown in a condition prior to initiation of toasting.

With reference to FIG. 3, prior to the initiation of toasting, the trip wire 120 and the drop frame 131 are positioned such that the free end of the trip wire 120 extends vertically below the drop frame 131. As such, the drop frame 131 is maintained in a raised set position. Also, the support frame 96 is biased in the direction of arrow 106 such that the compensator 125 engages the limiting arm 93 of the mounting bracket 92 so as to limit the movement of the support bracket 96 in the direction of arrow 106.

Figure 4:
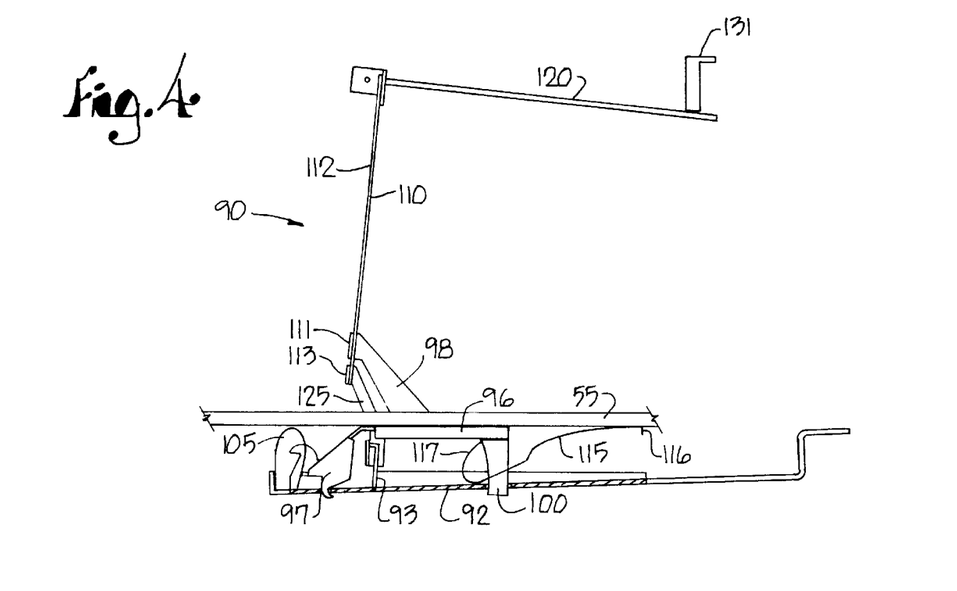
FIG. 4 is a side view of the temperature sensitive timing assembly of FIG. 1 shown in a condition immediately after initiation of toasting.

With reference to FIG. 4, upon initiation of toasting, the carriage frame 48 is lowered to the toasting position such that the bread support 55 engages and actuates the first free end 116 of the stop 115. Upon actuation, the stop 115 pivots and the second free end 117 of the stop 115 engages and locks the stop arm 100 of the support bracket 96 in a first position. As such, the support bracket 96, and thus the first portion 111 of the bimetallic element 110, are locked in the first position.

Figure 5:
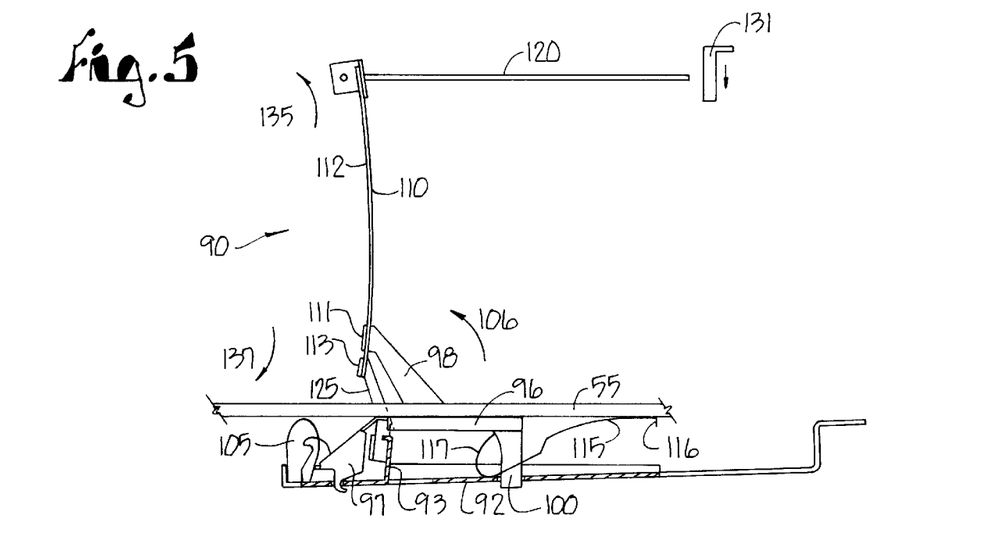
FIG. 5 is a side view of the temperature sensitive timing assembly of FIG. 1 shown in a condition subsequent to toasting and immediately before the release of the carriage assembly latch.

With reference to FIG. 5, as the heating elements 29 toast the bread slices, the interior of the toaster 10 heats up. When heated, the second portion 112 of the bimetallic element 110 bends in the direction of arrow 135. As such, the free end of the trip wire 120 also moves in the direction of arrow 135. After a predetermined amount of time, the trip wire 120 moves longitudinally inward of the drop frame 131 and ceases to support the drop frame 131. When this occurs, the drop frame 31 falls under the force of gravity to a lowered released position, abutting upon the carriage frame 48. This contact serves to pivot the latch 62 out of engagement with the detent 46. As such, the carriage frame 48 is not prevented from upward movement, and the carriage frame 48, and thus the bread support 55, begin to move toward the raised nontoasting position under the force of the biasing spring 60. The carriage frame 48 moves into abutment with the drop frame 131, drawing the drop frame 131 upward as well. Therefore, the carriage frame 48, and thus the bread support 55, automatically reset to the raised nontoasting position, causing the bread slices received within the cavities to be moved partially outward thereof to be manually removed by the user.

Simultaneously, as the heating elements 29 toast the bread slices and the interior of the toaster 10 heats up, the third portion 113 of the bimetallic element 110 bends in the direction of arrow 137. As such, the compensator 125 also moves in the direction of arrow 137 and out of engagement with the limiting arm 93 of the mounting bracket 92. As the carriage frame 48 moves toward the raised nontoasting position, the bread support 55 disengages the stop 115, which pivots and disengages the stop arm 100 of the support bracket 96. As such, the support bracket 96 moves in the direction of arrow 106 until the compensator 125 reengages the limiting arm 93 of the mounting bracket 92. The support bracket 96 is thereby pivoted to a second position.

Figure 6:
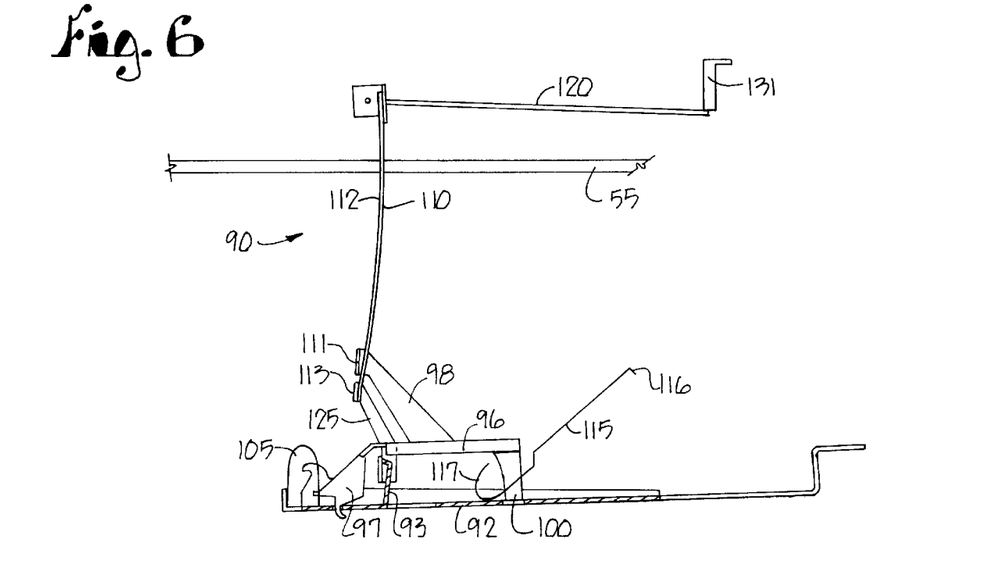
FIG. 6 is a side view of the temperature sensitive timing assembly of FIG. 1 shown in a reset condition subsequent to the completion of a first toasting cycle.

With reference to FIG. 6, after the completion of a first toasting cycle, the support bracket 96 and the bimetallic element 110 are thereby repositioned virtually instantaneously such that the free end of the trip wire 120 extends vertically below the drop frame 131 to maintain the drop frame 131 in a raised set position. As such, the timing assembly 90 is positioned such that a second toasting cycle providing the same toast color as the first toasting cycle can be initiated.

While the above invention has been described and illustrated with regard to a particular embodiment, it should be apparent to those skilled in the art that various modifications are possible. Thus, the invention is not limited to the specific forms or arrangement of parts described thereto, except insofar as such limitations are included in the following claims.

What is claimed and desired to be secured by Letters Patent is as follows:

1. A temperature sensitive timing assembly for a toaster, said toaster having a nontoasting mode and a toasting mode, said timing assembly including a mount, a support mounted for movement in first and second directions relative to said mount, a spring for biasing said support in said first direction, a stop for locking said support in a fixed position throughout a toasting cycle, and a single bimetallic element comprising:

(a) a first portion connected to said support and locked in a first position throughout a first toasting cycle;
    (b) a second portion spaced from said first portion and bending upon heating so as to operatively reset said toaster to said nontoasting mode at the end of said first toasting cycle; and
    (c) a third portion spaced from said first portion and bending upon heating so as to operatively reset said support to a second position at the end of said first toasting cycle;
    (d) said bending of said third portion compensating for said bending of said second portion whereby a second toasting cycle can be initiated virtually instantaneously after said first toasting cycle and whereby said second toasting cycle provides substantially the same toast color as said first toasting cycle.

2. A temperature sensitive timing assembly as in claim 1 wherein said third portion of said bimetallic element bends away from said mount upon heating so as to allow said support to bias toward said mount in said first direction at the end of said first toasting cycle and thereby reset to said second position.

3. A temperature sensitive timing assembly for a toaster for providing a virtually instantaneous reset time between toasting cycles and for providing substantially uniform toast color upon successive toasting cycles, said toaster having a carriage assembly and a lock release assembly, said timing assembly comprising:

(a) a mount;
    (b) a support mounted for movement in first and second directions relative to said mount;
    (c) a spring for biasing said support in said first direction;
    (d) a stop for operative connection to said carriage assembly and said support; and
    (e) a bimetallic element mounted to said support and having a first portion for connection to said support, a second portion for operative connection to said lock release assembly, and a third portion for operative engagement with said mount so as to limit said movement of said support in said first direction;
    (f) said stop locking said support in a first position when actuated by said carriage assembly at the beginning of a first toasting cycle such that said first portion of said bimetallic element is locked in said first position throughout said first toasting cycle;
    (g) said second portion of said bimetallic element bending upon heating so as to operatively activate said lock release assembly at the end of said first toasting cycle;
    (h) said third portion of said bimetallic element bending upon heating so as to operatively reset said support to a second position at the end of said first toasting cycle, said timing assembly thereby positioned to begin a second toasting cycle.

4. A temperature sensitive timing assembly as in claim 3 wherein said second portion of said bimetallic element bends away from said lock release assembly upon heating, and wherein said third portion of said bimetallic element bends away from said mount upon heating.

5. A temperature sensitive timing assembly as in claim 3 further comprising a trip wire connected to the end of said second portion of said bimetallic element whereby said trip wire moves in response to said bending of said second portion to thereby activate said lock release assembly at the end of said first toasting cycle.

6. A temperature sensitive timing assembly as in claim 3 further comprising a compensator connected to the end of said third portion of said bimetallic element whereby said compensator engages said mount upon said biasing of said support so as to limit said movement of said support in said first direction, and whereby said compensator moves out of engagement with said mount in response to said bending of said third portion of said bimetallic element to thereby allow said support to reset to said second position when said stop disengages said support at the end of said first toasting cycle.

7. A temperature sensitive timing assembly as in claim 3 wherein said bending of said third portion of said bimetallic element compensates for said bending of said second portion of said bimetallic element whereby said support resets to said second position virtually instantaneously at the end of said first toasting cycle such that said timing assembly is positioned to begin a second toasting cycle providing substantially the same toast color as said first toasting cycle.

8. A temperature sensitive timing assembly as in claim 3 wherein said mount is mounted to said toaster for pivotal movement in said first and second directions, and wherein said toaster further comprises a darkness control assembly operably connected to said mount such that said darkness control assembly pivots said mount in said first and second directions to lengthen or shorten, respectively, said toasting cycle.

9. A toaster appliance for toasting bread slices and other food products, said toaster including a carriage assembly, a lock release assembly, and a temperature sensitive timing assembly comprising:

(a) a mount;
    (b) a support mounted for movement in first and second directions relative to said mount;
    (c) a spring for biasing said support in said first direction;
    (d) a stop for operative connection to said carriage assembly and to said support; and
    (e) a bimetallic element mounted to said support and having a first portion for connection to said support, a second portion for operative connection to said lock release assembly, and a third portion for operative engagement with said mount so as to limit said movement of said support in said first direction;
    (f) said stop locking said support in a first position when actuated by said carriage assembly at the beginning of a first toasting cycle such that said first portion of said bimetallic element is locked in said first position throughout said first toasting cycle;
    (g) said second portion of said bimetallic element bending upon heating so as to operatively activate said lock release assembly at the end of said first toasting cycle;
    (h) said third portion of said bimetallic element bending upon heating so as to operatively reset said support to a second position at the end of said first toasting cycle, said timing assembly thereby positioned to begin a second toasting cycle.

10. A toaster appliance as in claim 9 wherein said bending of said third portion of said bimetallic element compensates for said bending of said second portion of said bimetallic element whereby said support resets to said second position virtually instantaneously at the end of said first toasting cycle such that said timing assembly is positioned to begin a second toasting cycle providing substantially the same toast color as said first toasting cycle.

11. A toaster appliance as in claim 10 wherein said mount is mounted to said toaster for pivotal movement in said first and second directions, and wherein said toaster further comprises a darkness control assembly operably connected to said mount such that said darkness control assembly pivots said mount in said first and second directions to lengthen or shorten, respectively, said toasting cycle.

12. A toaster appliance for toasting bread slices and other food products, said toaster comprising:
   (a) carriage means for conveying said bread slices between nontoasting and toasting positions;
   (b) lock release means for resetting said carriage assembly to said nontoasting position; and
   (c) timing means for providing a virtually instantaneous reset time between toasting cycles and for providing substantially uniform toast color upon successive toasting cycles, said timing means including:
      (i) support means for pivotal movement in first and second directions;
      (ii) mounting means for mounting said support means such that said support means pivots relative to said mounting means;
      (iii) spring means for biasing said support means in said first direction;
      (iv) stop means for operative connection to said carriage means and to said support means; and
      (v) bimetallic element means operatively attached to said support means and having a first portion for connection to said support means, a second portion for operative connection to said lock release means, and a third portion for operative connection to said mounting means so as to limit said movement of said support means in said first direction;
      (vi) said stop means locking said support means in a first position when said carriage assembly is moved to said toasting position at the beginning of a first toasting cycle such that said first portion of said bimetallic element means is locked in said first position throughout said first toasting cycle;
      (vii) said second portion of said bimetallic element means bending upon heating so as to operatively activate said lock release means at the end of said first toasting cycle;
      (viii) said third portion of said bimetallic element means bending upon heating so as to operatively reset said support means to a second position at the end of said first toasting cycle, said timing assembly thereby positioned to begin a second toasting cycle.

13. A toaster appliance as in claim 12 wherein said bending of said third portion of said bimetallic element means compensates for said bending of said second portion of said bimetallic element means whereby said support means resets to said second position virtually instantaneously at the end of said first toasting cycle such that said timing assembly is positioned to begin a second toasting cycle providing substantially the same toast color as said first toasting cycle.

14. A toaster appliance for toasting slices of bread and other food products, said toaster providing for a virtually instantaneous reset time between toasting cycles and providing for substantially uniform toast color upon successive toasting cycles, said toaster comprising:
   (a) a carriage assembly having a nontoasting position and a toasting position, said carriage assembly biased toward said nontoasting position and having a latch for locking said carriage assembly in said toasting position against the force of said bias;
   (b) a lock release assembly having a set position and a released position, said lock release assembly disengaging said latch of said carriage assembly when released to said released position; and
   (c) a temperature sensitive timing assembly including:
      (i) a mounting bracket;
      (ii) a support bracket mounted on said mounting bracket for pivotal movement in first and second directions relative to said mounting bracket;
      (iii) a spring for biasing said support bracket in said first direction;
      (iv) a stop for locking said support bracket in a fixed position when said carriage assembly is in said toasting position;
      (v) a bimetallic element mounted to said support bracket and having a first portion for connection to said support bracket, a second portion for operative connection to said lock release assembly, and a third portion for operative engagement with said mounting bracket;
      (vi) a trip wire connected to the end of said second portion of said bimetallic element; and
      (vii) a compensator connected to the end of said third portion of said bimetallic element.

* * * * *

UNITED STATES PATENT AND TRADEMARK OFFICE
CERTIFICATE OF CORRECTION

PATENT NO : 5,901,639
DATED : May 11, 1999
INVENTOR(S): Peter E. Huggler

It is certified that error appears in the above-identified patent and that said Letters Patent is hereby corrected as shown below:

In column 5, line 33, change "110" to --100--.
-- 100 --.

Signed and Sealed this

Twenty-eighth Day of December, 1999

Attest:

Q. TODD DICKINSON

Attesting Officer    Acting Commissioner of Patents and Trademarks